US012560104B2

(12) United States Patent

Pertat et al.

(10) Patent No.: US 12,560,104 B2

(45) Date of Patent: Feb. 24, 2026

(54) TURBOMACHINE COMPRISING AN OUTLET CONE INCORPORATING COMPONENTS COOLED BY CIRCULATION OF A COOLING FLOW

(71) Applicant: SAFRAN AIRCRAFT ENGINES, Paris (FR)

(72) Inventors: Adrien Pierre Jean Pertat, Moissy-Cramayel (FR); Paco Maurer, Moissy-Cramayel (FR); Nicolas Stoliaroff-Pepin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/293,904

(22) PCT Filed: Jul. 21, 2022

(86) PCT No.: PCT/FR2022/051465

§ 371 (c)(1),
(2) Date: Mar. 28, 2024

(87) PCT Pub. No.: WO2023/012419

PCT Pub. Date: Feb. 9, 2023

(65) Prior Publication Data

US 2025/0122812 A1     Apr. 17, 2025

(30) Foreign Application Priority Data

Aug. 2, 2021    (FR) ...................................... 21 08393

(51) Int. Cl.
*F01D 25/30*      (2006.01)
*F01D 9/06*      (2006.01)
(Continued)

(52) U.S. Cl.
CPC ........... *F01D 25/305* (2013.01); *F01D 9/065* (2013.01); *F01D 15/10* (2013.01); *F01D 25/12* (2013.01);
(Continued)

(58) Field of Classification Search
CPC ........ F01D 25/305; F01D 9/065; F01D 15/10; F01D 25/12; F01D 25/145; F01D 25/30;
(Continued)

(56) References Cited

U.S. PATENT DOCUMENTS

| | | | | |
|---|---|---|---|---|
| 1,410,726 A | * | 3/1922 | Schoonmaker, Jr. | ..... F01P 1/02 123/41.12 |
| 2,932,176 A | * | 4/1960 | Farkas | ..................... F24F 11/30 62/DIG. 5 |

(Continued)

FOREIGN PATENT DOCUMENTS

| | | | | |
|---|---|---|---|---|
| FR | 3088955 A1 * | 5/2020 | ................ | F02C 7/06 |
| FR | 3125844 A1 * | 2/2023 | ............ | F02K 1/822 |

(Continued)

OTHER PUBLICATIONS

International Search Report & Written Opinion issued Dec. 1, 2022 in PCT/FR2022/051465, filed on Jul. 21, 2022, 13 pages (with English Translation).

*Primary Examiner* — Brian Christopher Delrue
(74) *Attorney, Agent, or Firm* — Oblon, McClelland, Maier & Neustadt, L.L.P.

(57) ABSTRACT

A double-flow turbomachine has an exhaust casing through which a hot primary flow passes and surrounded by a cold secondary flow, and a cone carried by the exhaust casing. The exhaust casing has a hollow radial arm passing through the primary flow to convey air into the cone in order to form a cooling flow for components located in the cone. The cone has an outer wall and an inner wall which runs alongside the (Continued)

outer wall and is radially spaced therefrom to delimit a thermal insulation space through which the cooling flow passes from upstream to downstream before it is discharged through an outlet opening at the end of the cone. It has an inner cover surrounding a component to channel the cooling flow so that it runs along the component to cool it before passing through the thermal insulation space to be discharged there.

10 Claims, 3 Drawing Sheets

(51) Int. Cl.

| | |
|---|---|
| *F01D 15/10* | (2006.01) |
| *F01D 25/12* | (2006.01) |
| *F01D 25/14* | (2006.01) |
| *F02K 1/04* | (2006.01) |
| *F02K 1/82* | (2006.01) |

(52) U.S. Cl.
CPC ........... *F01D 25/145* (2013.01); *F01D 25/30* (2013.01); *F02K 1/04* (2013.01); *F02K 1/822* (2013.01); *F05D 2220/32* (2013.01); *F05D 2240/14* (2013.01); *F05D 2240/15* (2013.01); *F05D 2260/20* (2013.01); *F05D 2260/231* (2013.01)

(58) Field of Classification Search
CPC .............. F02K 1/04; F02K 1/822; F02C 7/18; F05D 2220/32; F05D 2240/14; F05D 2240/15; F05D 2260/20; F05D 2260/231
See application file for complete search history.

(56) References Cited

U.S. PATENT DOCUMENTS

| | | | | |
|---|---|---|---|---|
| 8,099,966 | B2 * | 1/2012 | Mossberg | B64D 13/08 |
| | | | | 62/239 |
| 10,975,770 | B1 * | 4/2021 | Simpson | F02C 7/18 |
| 11,898,517 | B2 * | 2/2024 | Belmon | F01D 9/065 |
| 12,286,930 | B1 * | 4/2025 | Heeter | F04D 29/5826 |
| 2002/0125340 | A1 * | 9/2002 | Birch | F02K 1/46 |
| | | | | 60/770 |
| 2006/0073010 | A1 * | 4/2006 | Busekros | F01D 25/12 |
| | | | | 415/177 |
| 2008/0271465 | A1 * | 11/2008 | Mossberg | B64D 13/08 |
| | | | | 454/76 |
| 2009/0078496 | A1 * | 3/2009 | Francisco | F02C 7/24 |
| | | | | 181/213 |
| 2011/0239656 | A1 * | 10/2011 | Crume | F02C 7/1435 |
| | | | | 60/39.53 |
| 2014/0286763 | A1 * | 9/2014 | Munshi | F02C 7/12 |
| | | | | 415/178 |
| 2015/0138342 | A1 * | 5/2015 | Brdar | G01N 21/8851 |
| | | | | 348/128 |
| 2019/0316486 | A1 * | 10/2019 | Roberge | F02C 7/18 |
| 2020/0230645 | A1 * | 7/2020 | Overholser | C23C 18/1212 |
| 2022/0025833 | A1 * | 1/2022 | Belmon | F02K 1/04 |

FOREIGN PATENT DOCUMENTS

| | | | | |
|---|---|---|---|---|
| GB | 695482 | 8/1953 | | |
| WO | WO-2024035537 A1 * | 2/2024 | ........... | F01D 25/265 |

* cited by examiner

TURBOMACHINE COMPRISING AN OUTLET CONE INCORPORATING COMPONENTS COOLED BY CIRCULATION OF A COOLING FLOW

TECHNICAL FIELD

The invention relates to an arrangement of a double-flow turbomachine having, downstream, an outlet cone containing components, the cooling of which is optimised, this turbomachine being a turbojet, turbofan, turboprop, open rotor or similar.

PRIOR ART

In a turbojet, air enters an inlet duct to pass through a fan having a series of rotating blades before splitting into a central primary flow and a secondary flow surrounding the primary flow.

The primary flow is then compressed in compression stages before reaching a combustion chamber, after which it is expanded through high-pressure and low-pressure turbines before being discharged to the rear. Meanwhile, the secondary flow is propelled directly backwards by the fan into a duct delimited externally by an engine fairing.

Such an engine has a low-pressure spool by means of which the fan is coupled to the low-pressure turbine, and a high-pressure spool by means of which the high-pressure compressor is coupled to the high-pressure turbine, these two spools being coaxial and rotationally independent.

Downstream of the low-pressure turbine, this engine is equipped with an outlet cone to limit turbulence in the ejected flow. As a result of the high temperature of the primary flow circulating around this cone, the temperature inside the cone is high, which limits the possibility of integrating components in this cone, meaning that it constitutes a large unused space.

The object of the invention is to provide a solution for effectively cooling components incorporated in the inner space of the outlet cone of such an engine.

DISCLOSURE OF THE INVENTION

To achieve this, the object of the invention is a double-flow turbomachine having an exhaust casing through which a hot primary flow passes and surrounded by a cold secondary flow, and a cone carried by this exhaust casing, this exhaust casing having a hollow radial arm passing through the primary flow to convey a cooling flow to cool components located in this cone, this cone having an outer wall and an inner wall which runs alongside the outer wall and is radially spaced therefrom to delimit a thermal insulation space through which the cooling flow passes from upstream to downstream before it is discharged through an outlet opening at the end of the cone, characterised in that it has a cover surrounding at least one component to channel the cooling flow so that it runs along the outside of this component to cool it before passing through the thermal insulation space to be discharged.

With this arrangement, the air circulates as close as possible to the components to maximise heat exchange and ensure much more effective cooling than by simply ventilating the entire inner space of the cone. It is thus possible to install an electrical machine such as a current generator or an engine in the outlet cone.

Another object of the invention is a turbomachine as defined above, wherein the cooling flow conveyed in the hollow radial arm is part of the secondary flow.

Another object of the invention is a turbomachine as defined above, wherein at least one component cooled by the cooling flow is an electrical machine such as a current generator or an engine.

Another object of the invention is a turbomachine as defined above, wherein the cooling flow passes through an inner region of at least one component before being channeled by the cover to run alongside this component.

Another object of the invention is a turbomachine as defined above, comprising a substantially cylindrical heat radiation shield positioned radially between the cover and the cone.

Another object of the invention is a turbomachine as defined above, wherein the heat radiation shield delimits a baffle for the cooling flow.

Another object of the invention is a turbomachine as defined above, wherein the cover and/or one of the walls of the cone consists of and/or is covered by a thermally insulating material.

Another object of the invention is a turbomachine as defined above, comprising several components cooled by the cooling flow, and wherein the component having the lowest maximum permissible temperature is placed upstream of the other components in relation to the path of the cooling flow in the cone.

Another object of the invention is a turbomachine as defined above, comprising means such as a fan or pump to force the cooling flow to circulate when the turbomachine is at a standstill.

Another object of the invention is a turbomachine as defined above, comprising butterfly valve-type means to regulate the flow rate of the cooling flow circulating in the cone.

DETAILED DISCLOSURE OF PARTICULAR EMBODIMENTS

Figure 1:
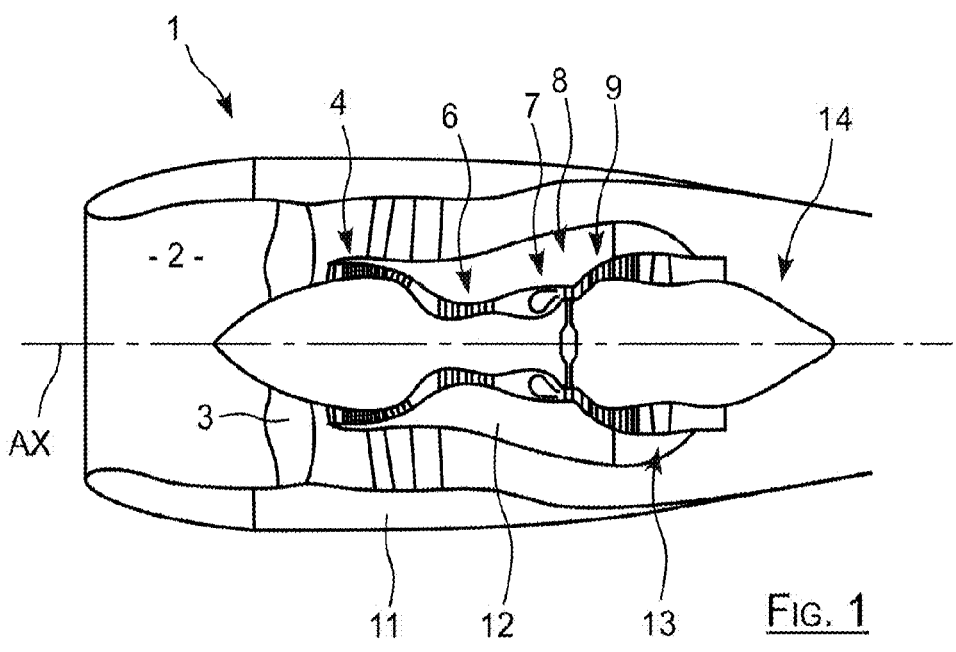
FIG. 1 is a schematic representation of a turbofan engine shown in longitudinal section.

In the turbojet 1 shown in FIG. 1, the air enters an upstream part AM at an inlet duct 2 to pass through a fan 3 having a series of rotating blades before splitting into a central primary flow and a secondary flow surrounding the primary flow. These two flows circulate in the engine along its longitudinal direction AX, from the upstream AM to the downstream AV of this engine.

The primary flow is then compressed in low-pressure compressors 4 and high-pressure compressors 6 before reaching a combustion chamber 7, after which it is expanded through a high-pressure turbine 8 and a low-pressure turbine 9 before being discharged to the rear. Meanwhile, the secondary flow is propelled directly backwards by the fan into a duct delimited externally by a fairing 11.

Such a twin-spool engine has a low-pressure spool by means of which the fan 3 is coupled to the low-pressure turbine 9, and a high-pressure spool by means of which the high-pressure compressor 6 is coupled to the high-pressure turbine 8, these two spools being coaxial and rotationally independent.

These spools are surrounded by a set of casings 12 running along the engine. These casings 12 have inner shells surrounded by outer shells and connected to each other by radial arms, the primary flow circulating in an annular space extending between these inner and outer shells. This assembly of casings 12 is itself surrounded by the engine fairing 11, while further being designed to be connected to an aircraft structure via standard fittings.

The casing located downstream of the low-pressure turbine, known as the exhaust casing 13, carries downstream of its central region an outlet cone 14 intended to limit the formation of turbulence in the hot primary flow ejected by the low-pressure turbine 9, and circulating around this cone 14.

Figure 2:
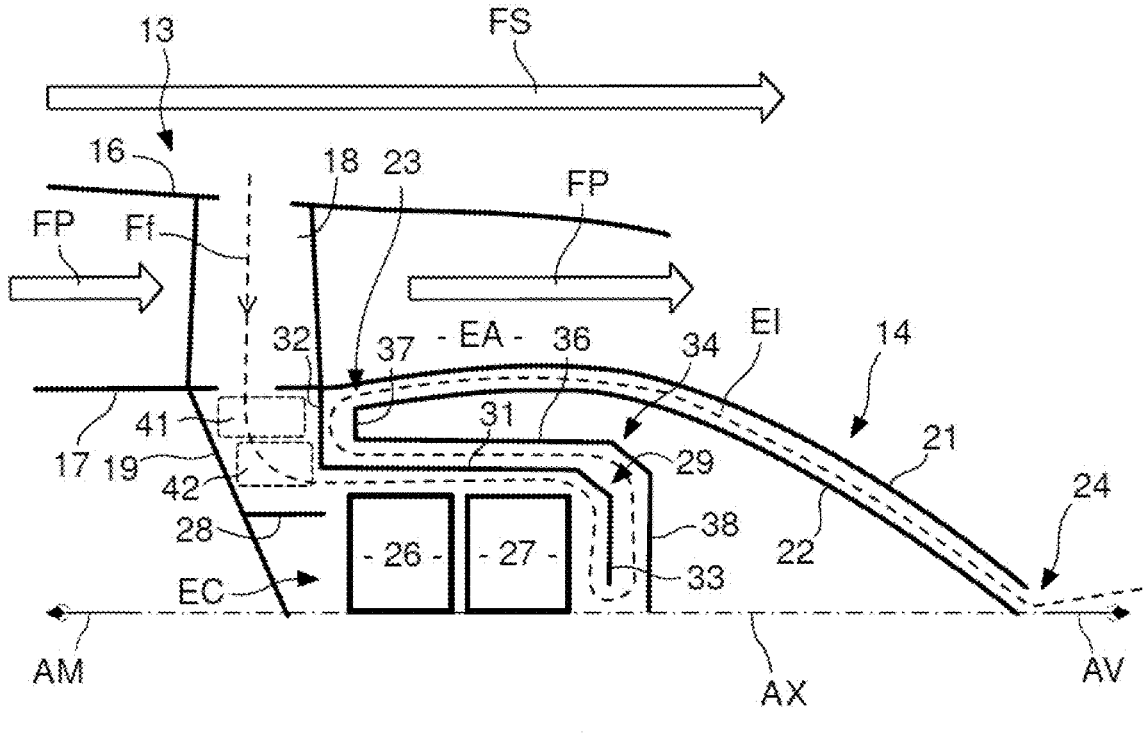
FIG. 2 is a schematic longitudinal sectional view of a rear section of a turbojet according to the invention.

As shown more clearly in FIG. 2, this exhaust casing 13 more specifically has an outer shell 16 surrounding an inner shell 17 connected to one another by radial arms with reference number 18, these shells together delimiting an annular space EA through which the hot primary flow FP passes.

The inner shell 17 delimits a generally cylindrical central space EC which is closed at least partly on the upstream side by an upstream wall 19, and on the downstream side by the outlet cone 14 which extends in the downstream extension of this inner shell 17.

The outlet cone 14 has a conical outer wall 21 which extends the inner shell 17, and an inner wall 22 which is also conical and runs along the inner face of the wall 21 while being radially spaced therefrom to delimit with it a thermal insulation space EI of the cone 14.

This space EI has a conical shape of revolution due to the fact that these two walls 21 and 22 have generally conical shapes, their upstream circular edges together delimiting an intake opening 23 into this space EI, and these walls are open at their downstream ends to jointly delimit an outlet opening 24 from this space EI.

As shown in FIG. 2, the radial arm 18 passing through the primary duct in which the primary flow FP circulates, is hollow, to convey air, for example, from the cold secondary flow FS circulating in the secondary duct towards the central space EC. This may be air taken from the secondary flow FS by means of a scoop or air coming from another source and conveyed to the radial arm 18 by means of one or more supply tubes. This air forms a cooling flow Ff, and is collected, for example, with a scoop (not shown) extending the arm 18 into the secondary flow.

The cooling flow Ff is designed to cool components 26 and 27 located in the central space EC which are, for example, electrical machines such as engines for rotating the central shaft of the turbomachine, located around it or at its downstream end. More specifically, the cooling flow Ff which circulates in a centripetal direction in the arm 18 runs along the upstream wall 19 after passing the radially inner end of this arm 18, before being deflected by a deflector 28 in order to circulate longitudinally around the components 26 and 27, from upstream AM to downstream AV. This deflector 28 is, for example, a cylindrical sheet coaxial with the axis AX, the upstream edge of which is fixed to the downstream face of the wall 19.

When the cooling flow Ff circulates around the components 26 and 27, it is channeled by a cover 29 which extends around the components 26 and 27 to run along the outside of these components in order to cool them.

This cover 29 includes here a cylindrical sheet body 31 coaxial with the axis AX and surrounding the components 26 and 27, the upstream edge of which is secured to the inner shell 17, for example, by a sheet 32 in the form of a ring oriented normally to the axis AX, and the downstream edge of which is extended by a base 33 located downstream of the component 27, this base here also being a sheet in the form of a ring oriented normally to the axis AX and extending radially towards the inside of the body 31.

After passing along the components 26 and 27 along the body 31 of the cover, the flow Ff is deflected radially by the base 33 in order to cool a downstream face of the component 27, circulating in a centripetal direction. When the flow Ff reaches a central opening of the base 33, it is channeled by a guide 34 in order to circulate in a centrifugal direction along the downstream face of the base 33.

The guide 34 surrounds the cover 29 and has the same shape as this cover 29, i.e. having a guide body 36, having its upstream edge connected to the upstream edge of the inner wall 22 by a sheet 37 in the form of a ring, this body 36 having its downstream edge extended by a base 38 in the form of a disc oriented normally to the axis AX and located downstream of the base 33.

As shown in FIG. 2, the cover 29 and the guide 34 together delimit a space of revolution enabling the flow Ff to be collected at the outlet of the cover 29 in order to channel it into the intake opening 23 of the space EI so that it circulates there before being discharged via the outlet 24.

The walls 21 and 22 delimiting the space EI form a double skin of the cone 14 which, thanks to the circulation of the flow Ff, forms a thermal barrier limiting the heating of the inside of the cone 14 by the hot primary flow FP flowing around it.

This thermal barrier can be further improved by covering a wall of the cone with paint that insulates against heat radiation or by adding an additional heat radiation shield or anti-heat radiation wall. It can also be improved by using thermal insulation on the wall 21 and/or 22 of the cone to limit heat transfer by conduction.

In general, the idea behind the invention is to channel the cooling air into the cone 14 and to limit the heating of the wall of this cone so as to maximise the cooling of the components contained in this cone. The cooling obtained in this way is sufficiently effective to cool a thermal machine that generates heat, such as a current generator or an electric motor, which can therefore be placed in the space that delimits the outlet cone.

Figure 3:
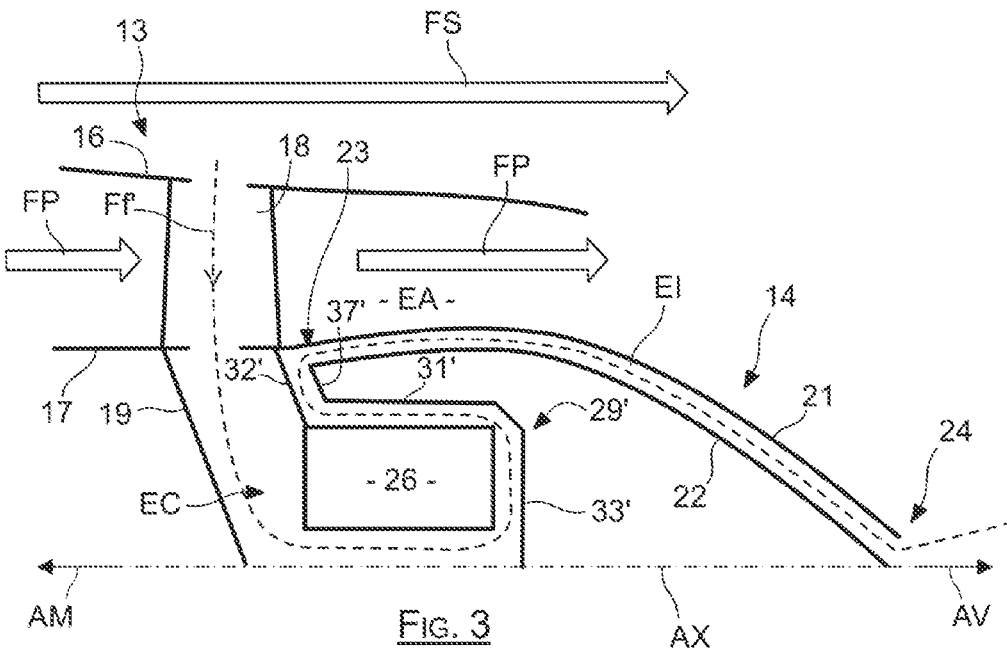
FIG. 3 is a schematic longitudinal sectional view of a rear section of a turbojet according to a first embodiment of the invention.
Figure 4:
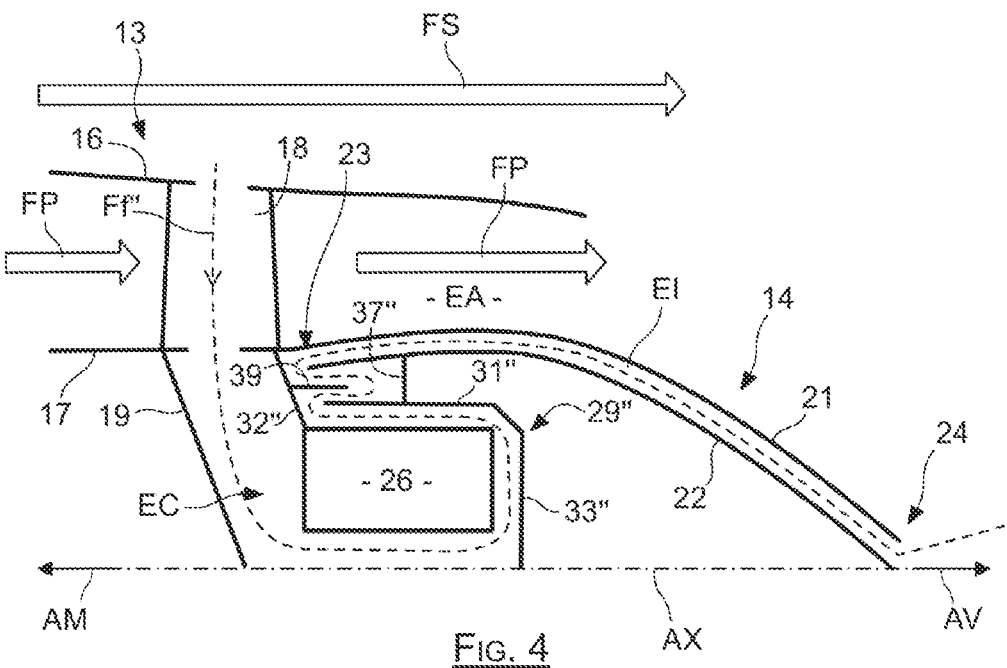
FIG. 4 is a schematic longitudinal sectional view of a rear section of a turbojet according to a second embodiment of the invention.

The example of the flow Ff path shown in FIG. 2 is one of several possibilities, given that FIGS. 3 and 4 show two other exemplary cold flow paths also enabling this cooling to be optimised. These paths can be further optimised or modified to add meanders or baffles so as to optimise heat exchange in the appropriate zones.

In the example shown in FIG. 3, the cooling flow Ff' also enters via the arm 18, but instead of being deflected by a deflector, it circulates in a centripetal direction along the wall 19 until it reaches a region close to the axis AX so as to then circulate longitudinally from upstream to downstream in the component 26 in order to cool the inside of it. After passing longitudinally through the inner region of the component 26, this flow Ff' is deflected by a cover 29' surrounding this component 26. In the example shown in FIG. 3, a single component with an internal cooling passage is considered rather than two separate components as in FIG. 2. A first component could be provided with an internal cooling passage, being in proximity to a second component arranged for air to flow around it after passing through the first component.

This cover 29' has a cylindrical body 31' extended downstream by a base 33' oriented normally to the axis AX and formed by a disc-shaped sheet. This body 31' is extended upstream by a sheet 37' in the form of a ring, and by means of which it is connected to an upstream edge of the inner wall 22.

Additionally, another sheet 32' in the form of a ring oriented substantially normally to the axis AX connects the shell 17 to an outer face of the component 26, being located upstream of the sheet 37'.

Thus, after passing through the inner region of the component 26, the flow Ff is first of all deflected in order to circulate radially in a centrifugal direction between a downstream face of the component 26, before being deflected by the body 31' in order to circulate around the component 26 by circulating from the downstream AV to the upstream AM so as to cool the outside of this component 26.

After passing the upstream edge of the body 31', the flow Ff is deflected by the sheets 32' and 37' between which it passes, circulating radially in a centrifugal direction, in order to be channeled into the intake opening 23 of the space EI so as to circulate there from upstream to downstream before being discharged via the outlet 24.

As can be seen, this other flow Ff path ensures cooling of an inner region of the component 26, i.e. as close as possible to the region in which heat is generated in this component.

Optionally, and as shown in FIG. 4, an additional protective sheet 39 in the form of a heat radiation shield is positioned between the outlet of the cover and the inlet of the cooling flow into the space EI, with reference Ff" in this FIG. 4, being located radially between the body 31" and the cone 14.

In this other example, the cover 29" also includes a cylindrical body 31" closed at its downstream by a disc-shaped base 33" normal to the axis AX. But the cover 29" is carried by a sheet in the form of a ring 37" connecting a central region (along the axis AX) of the body 31" to a region of the inner wall 22 located downstream of the upstream edge of this wall 22.

Additionally, another sheet 32" in the form of a ring oriented substantially normally to the axis AX connects the shell 17 to an outer face of the component 26, being located upstream of the sheet 37". This other sheet 32" carries the protective cylindrical sheet 39 coaxial with the axis AX, extending between the wall 22 and the body 31', with its upstream edge rigidly attached to the downstream face of the sheet 32".

This protective sheet 39 provides protection against heat radiation from the primary flow FP circulating immediately downstream of the arms 18, i.e. in the region where it is the hottest and therefore radiates the strongest. In practice, this sheet is a heat radiation shield such as a sheet covered with a thermally insulating coating in the form of a thermal paint to limit radiative exchange.

Additionally, and as shown in FIG. 4, the presence of this protective sheet 39 delimits an additional baffle in the flow Ff" path, which ensures that it is also strongly cooled by this flow Ff", to increase its thermal protection capacity.

After passing the baffle resulting from the presence of the protective sheet 39, the flow Ff" enters the intake opening 23 of the space EI and passes from upstream to downstream before being discharged at its outlet 24.

As indicated above, the protective sheet 39 reduces heat exchange to keep the component 26 at the lowest temperature, but this can also be achieved by thermally protecting the arm 18 and the walls 21 and 22 of the cone. This additional thermal protection can take the form of thermally insulating materials with low thermal conductivity integrated into the parts themselves or applied to their surface. These may be, for example, silica fibre-based materials applied to the arm and walls of the cone, and possibly to other elements of the internal environment of the cone.

More generally, according to the invention, the circulation of the cooling flow is arranged in a labyrinthine path, through the elements that are the cover, the guide and other sheet elements, to optimise the cooling of the components contained in the cone. Once the flow leaves the radial arm through which it is conveyed, it is channeled to run directly alongside the components to be cooled, when it is still coldest, so as to maximise the cooling of these components.

Figure 5:
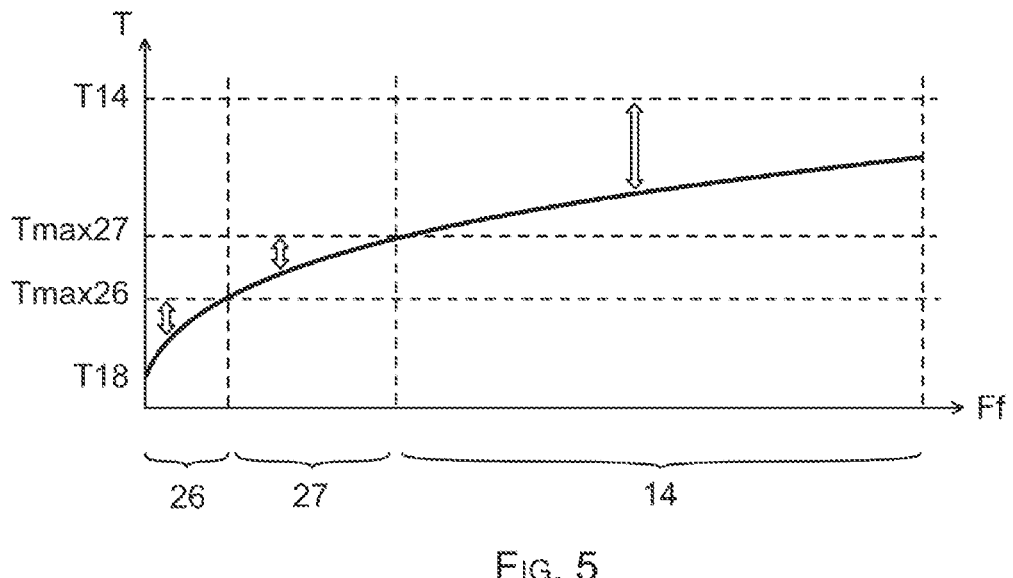
FIG. 5 is a graph showing the thermal trend of the cooling flow along its path.

As shown in the graph in FIG. 5, which gives the temperature T of the flow Ff on the Y-axis as a function of its progress along its path corresponding to the X-axis, the heat exchanges are hierarchical.

More specifically, when the flow Ff leaves the arm 18, it is at a relatively low temperature T18 close to that of the secondary flow FS, and which is lower than the maximum permissible temperature Tmax26 of the first component 26 to be cooled. As it passes along the component 26, the flow Ff heats up, cooling it, until it reaches a temperature close to Tmax26, before reaching the next component 27, the maximum permissible temperature of which is designated Tmax27.

After passing along the component 27 to cool it, the temperature of the flow Ff has increased to be at a value relatively close to Tmax27, before entering the space EI of the cone 14 which is at a significantly higher temperature designated T14, such that this flow Ff has been heated, but it is still at a sufficiently low temperature to cool the cone 14 before being discharged via the outlet opening 24.

In this way, the path of the cooling flow is optimised to first of all cool the elements that have to be kept at the lowest temperature before cooling the elements with a higher temperature, such that this flow Ff heats up along its path whilst ensuring optimum cooling of the various elements that it passes through.

This cooling can be improved by providing that the thermal barriers formed by the cover and/or by one of the walls of the cone are elements made of or covered by an insulating material.

The cooling can be further maximised by forcing the cooling flow to circulate, for example by means of a fan or a pump 41, in order in particular to ensure cooling of the components located in the cone 14 for a predetermined time period after the engine has stopped, and in order to compensate for pressure losses during normal operation.

The circulation of the cooling flow can be further regulated, either passively or actively, by means of a valve that controls the air flow of the cooling flow. This can be a butterfly valve 42 actuated by a control unit in order to increase the flow rate when more cooling is required, for example during the take-off phase of the aircraft.

Furthermore, the examples in the figures show arrangements in which the cooling flow has a single branch. However, this cooling flow can be split into several separate branches, each of which can have its flow rate regulated separately by as many valves or diaphragms as there are separate branches, so as to ensure that the cooling required for each region corresponding to a branch is just right.

Finally, this cooling can be accompanied by a second cooling, which is internal to the equipment, provided by a heat transfer fluid, for example.

The invention claimed is:

1. A double-flow turbomachine comprising:

an exhaust casing through which a hot primary flow passes and surrounded by a cold secondary flow, and a cone carried by the exhaust casing, the exhaust casing having a hollow radial arm passing through the primary flow to convey a cooling flow to cool a component located in the cone, the cone having an outer wall and an inner wall which runs alongside the outer wall and is radially spaced therefrom to delimit a thermal insulation space through which the cooling flow passes from upstream to downstream before the cooling flow is discharged through an outlet opening at an end of the cone, wherein the turbomachine has a cover surrounding the component to channel the cooling flow so that the cooling flow runs along an outside of the component to cool the component before passing through an entirety of the thermal insulation space from upstream to downstream prior to being discharged.

2. The turbomachine according to claim 1, wherein the cooling flow conveyed in the hollow radial arm is part of the secondary flow.

3. The turbomachine according to claim 1, wherein the component cooled by the cooling flow is an electrical machine.

4. The turbomachine according to claim 1, wherein the cooling flow passes through an inner region of the component before being channeled by the cover to run alongside the component.

5. The turbomachine according to claim 1, comprising a substantially cylindrical heat radiation shield positioned radially between the cover and the cone.

6. The turbomachine according to claim 5, wherein the heat radiation shield delimits a baffle for the cooling flow.

7. The turbomachine according to claim 1, wherein at least one of the cover and one of the outer and inner walls of the cone includes a thermally insulating material.

8. The turbomachine according to claim 1, comprising several components cooled by the cooling flow, and wherein the component having a lowest maximum permissible temperature is placed upstream of the other components in relation to the path of the cooling flow in the cone.

9. The turbomachine according to claim 1, further comprising a fan or a pump to force the cooling flow to circulate when the turbomachine is at a standstill.

10. The turbomachine according to claim 1, further comprising a butterfly valve to regulate the flow rate of the cooling flow circulating in the cone.

* * * * *